US009692837B2

(12) United States Patent
Penov et al.

(10) Patent No.: US 9,692,837 B2
(45) Date of Patent: Jun. 27, 2017

(54) FEDERATED APPLICATION SERVICES

(71) Applicant: Facebook, Inc., Menlo Park, CA (US)

(72) Inventors: Francislav Penov, Kirkland, WA (US); Michael J. Marucheck, Bellevue, WA (US); Austin Randolph Longino, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 87 days.

(21) Appl. No.: 14/593,215

(22) Filed: Jan. 9, 2015

(65) Prior Publication Data
US 2016/0205201 A1 Jul. 14, 2016

(51) Int. Cl.
*H04L 29/08* (2006.01)
(52) U.S. Cl.
CPC ............ *H04L 67/16* (2013.01); *H04L 67/26* (2013.01); *H04L 67/303* (2013.01)
(58) Field of Classification Search
CPC ........ H04L 67/16; H04L 67/26; H04L 67/303
USPC ........ 709/203, 217, 218, 219, 221; 719/319, 719/320
See application file for complete search history.

(56) References Cited

U.S. PATENT DOCUMENTS 9,531,775 B2* 12/2016 Chan ................. G06F 17/30085
2008/0002711 A1* 1/2008 Bugenhagen ......... H04W 28/18
370/395.2
2008/0072273 A1 3/2008 Oh et al.
2012/0072991 A1* 3/2012 Belani .................. H04W 4/001
726/25
2014/0136662 A1 5/2014 Chan et al.
2015/0312146 A1* 10/2015 Kang ..................... H04W 4/00
370/392

FOREIGN PATENT DOCUMENTS

WO WO 2014/073882 5/2014

OTHER PUBLICATIONS

Veritas Cluster Server Implementation Guide—Symantec, Apr. 2007 https://sort.symantec.com/public/documents/sf/5.1/esx/pdf/vcs_implementation.pdf.*
International Search Report and Written Opinion for Application No. PCT/US2015/010978, Oct. 6, 2015.

* cited by examiner

*Primary Examiner* — Randy Scott
(74) *Attorney, Agent, or Firm* — Baker & Botts L.L.P.

(57) ABSTRACT

In one embodiment, a method includes receiving a request from an application for access to a service. The application is one of a number of applications that each includes software for accessing the service. The method includes selecting one of the applications to use to access the service, and providing the requesting application access to the service through the selected application's software for accessing the service.

20 Claims, 4 Drawing Sheets

FEDERATED APPLICATION SERVICES

TECHNICAL FIELD

This disclosure generally relates to services for client applications.

BACKGROUND

Computing devices may execute software applications, such as games, web browsers, messaging services, or social-networking applications. With social-networking applications, users may connect, communicate, and share information with other users in their social networks. Applications may interface with hardware and software to provide functionality to a user. For example, a mobile device may include applications that access sensor output to locate the client device, such as output from a global positioning system (GPS) chipset on the mobile device. As another example, applications on a computing device may use functionality of an operating system, such as memory management functionality, during execution of the application.

SUMMARY OF PARTICULAR EMBODIMENTS

Applications on a client device may utilize one or more services to provide functionality to a user and/or to interface with hardware or software. In particular embodiments, the software of an application on a client device that uses or has access to a particular service may include both a software client for the application and an instance of the service, i.e., the software for accessing or providing the service. In particular embodiments, the clients of multiple applications may share use of or share access to a service associated with a particular application on the client device, such as a push service, even if each of those applications includes its own instance of the service.

After an application requests access to a service, a determination is made regarding which instance of the service should be accessed or used by the application. The instance used may be an instance that is included in the requesting application or, alternatively, may be an instance associated with another application on the client device. The determination may be made based on any suitable criteria. For example, a protocol version of the instance, an attribute of an application associated with the instance, the version of the instance, or any combination thereof may be used to determine whether the particular instance of the service should be used by one or more applications of the client device requesting the service.

In particular embodiments, a service may be a selection service that determines which instance of a service, such as another service, a requesting application should use. If multiple instances of the selection service exist (for example, if multiple applications each include an instance of the selection service), then the appropriate instance of the selection service may be determined and used to select the instance of the requested service. The instance of the selection service selected based on any suitable criteria, including but not limited to the criteria described above.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
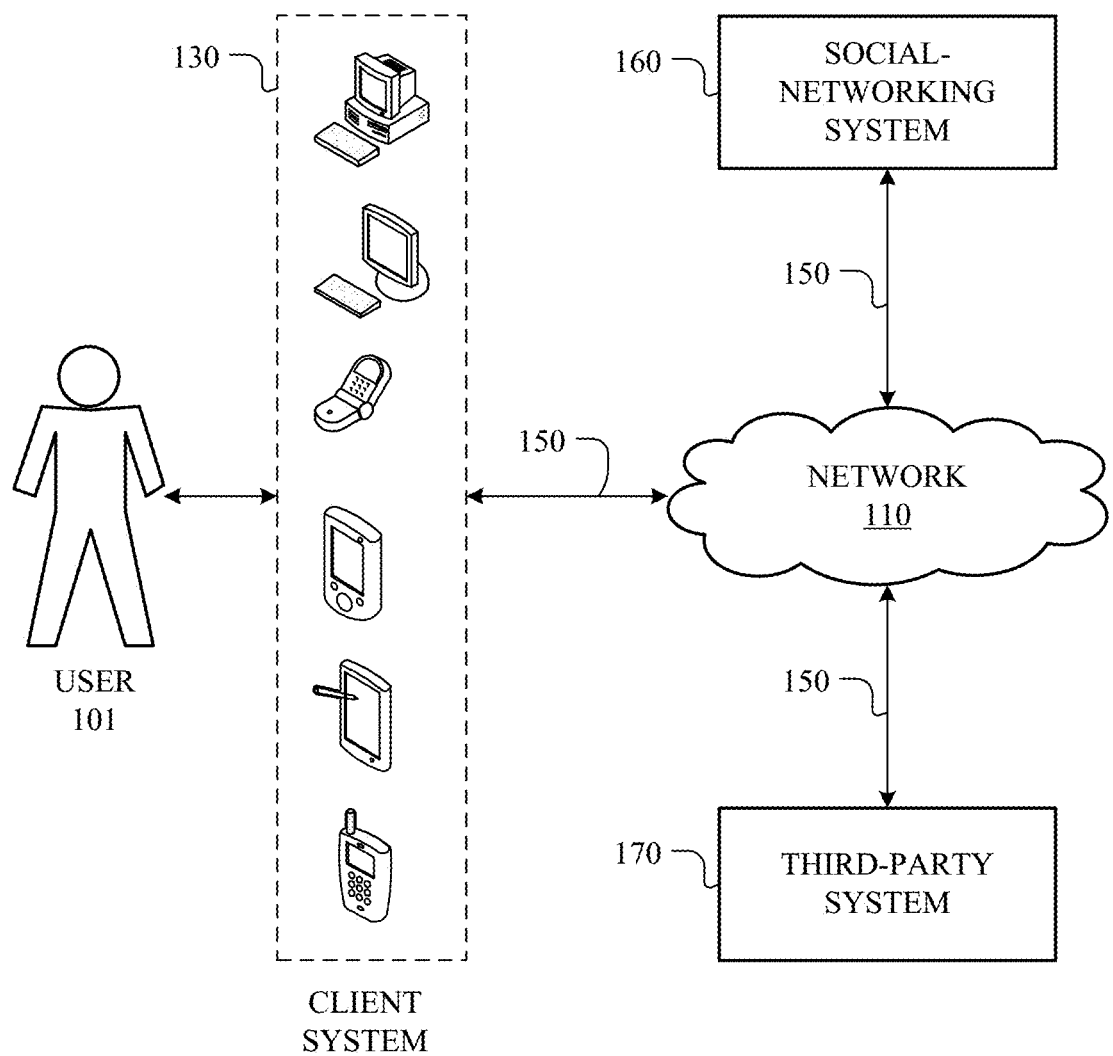
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system. Third-party system 170 may generate, store, receive, and send data. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Applications on a client device may utilize one or more services to provide functionality to a user and/or to interface with hardware or software. For example, an application may access one or more application programming interfaces (APIs) to communicate with an operating system; other software programs (such as, for example, a graphics rendering program); hardware on the client device; or external hardware, such as one or more servers or wireless network communication points, or software running on servers or other external or remote computing devices. The functionality provided by an API or the software or hardware that the API interfaces with is an example of a service. For example, a client computing device may, through an API, communicate with an external push server to receive push notifications. Push notifications may be provided by one or more servers to one or more specific applications. For example, a social-networking application may receive push notifications from one or more servers of a social-networking system associated with the application when activity relevant to a user of the application occurs on the social-networking system. As another example, a service may include access to hardware or software functionality of a computing device, such as the GPS sensors (or data they output) on the computing device, or the computing device's clock. While this disclosure discusses particular examples of services, this disclosure contemplates any suitable service.

In particular embodiments, the software of an application that uses or has access to a service may include a client and an instance of the service, e.g., the software for accessing or providing the service. For example, a messaging application may include a messaging client and one or more APIs to access a push service, and a navigation application may include a navigation client and also include one or more APIs to access a push service, even if the push service in each case is provided by communication with the same (or associated) server(s) using the same (or associated) communication protocols. For example, the messaging application and the navigation application may each use their own associated instances of the push service to receive notifications, even though the push notifications in both cases are provided by the same servers, e.g., of a social-networking system.

In particular embodiments, applications may share use of or share access to a particular instance of a service, such as a push service, even if each of those applications includes its own unique instance of the particular service. In other words, several applications may each include an instance of a service, yet two or more of the applications may access the service through a particular one of the instances of the service. For example, the instance of a push service associated with one application may communicate with one or more push servers to provide push services to multiple applications, even though each of those applications may include the capability (e.g. include or have access to their own instance of the necessary software) to communicate with the push servers. Thus, in particular embodiments, one application may have a socket open to communicate with a server, and data from the server is multiplexed over the single socket connection to provide the service to multiple applications.

Figure 2:
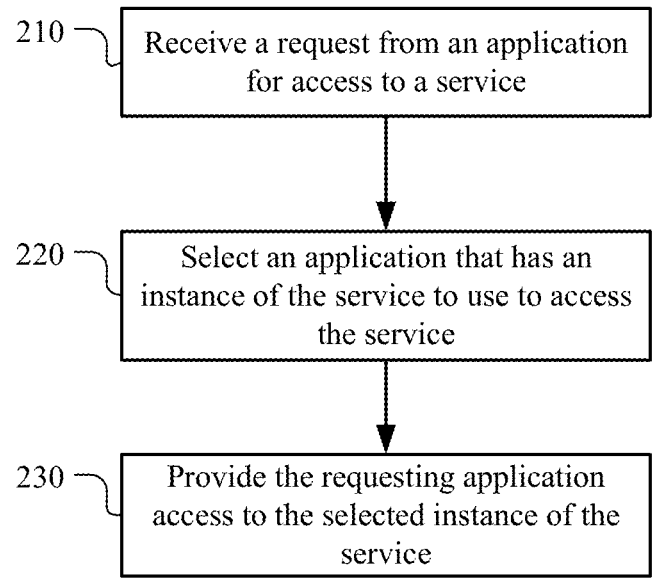
FIG. 2 illustrates an example method for determining which of two or more instances of a service an application should use.

FIG. 2 illustrates an example method 200 for determining which of two or more instances of a service an application should use. The method may be performed by any suitable software. For example, all or some of the applications on a client computing device may be capable of performing method 200. As another example, all or some of the applications on a client computing device may access software, such as another application, for performing the method. For example, as described more fully herein, method 200 may be performed by an independent selection service that is accessible by one or more applications on a device.

The method of FIG. 2 may begin at step 210, where a request from an application (such as, for example, from an application's client for accessing the selection service) for access to a service is received, e.g., by an instance of a selection service or by software associated with the instance of the selection service. As described above, the request may be received by an instance of the selection service that is part of the application submitting the request. In other words, receiving the request may involve receiving by a selection service a request generated by the application associated with that selection service. In particular embodiments, a request for access to service may be made by an application each time the application is started up on the client device. In other words, the application being loaded into random access memory on the client device, whether running in the background or foreground of the client device, may constitute a request by the application for one or more services. For example, each time a social-networking application is loaded on the client device, the application may submit a request for access to a push service to receive push notifications relevant to the application. As another example, each time the social-networking application is loaded on the client device a notification of that event may be provided to software implementing method 200, which constitutes a request by the social-networking application for access to the push service In particular embodiments, each time an application that includes an instance of a service is installed on a device, the installation may be interpreted by the selection service (or by software that monitors installation and is accessible by the selection service) as a request by an application to access the service. For example, suppose that multiple applications are sharing access to an instance of a push service associated with a particular application. In other words, the instance of the push service associated with the particular application was determined to be the instance that each application on the client device should access for the push service. When another application with an instance of the push service is installed on the client device, that newly installed instance may be the appropriate instance for the applications to use, e.g., because the service associated with the newly installed application may be the newest instance of the service Thus, the installation may trigger a determination of which instance of the push service to use (the determination taking into account some or all installed applications, including the just installed application), for example, by performing the example determination method of FIG. 2. All or some of the applications using the instance of the service may submit their own request for access to the service when an application is installed, or alternatively the installation of an application may be considered a request from all or some of the applications using the service for access to the service.

In particular embodiments, each time an application that includes an instance of a service is updated on a device, the update may be interpreted as a request by an application to access the service. In particular embodiments, each time an application that includes an instance of a service is updated, the update may be interpreted by the selection service (or by software that monitors updates and is accessible by the selection service) as a request by an application to access the service. For example, suppose that multiple applications are sharing access to an instance of a push service associated with a particular application. In other words, the instance of the push service associated with the particular application was determined to be the instance that each application on the client device should access for the push service. When another application with an instance of the push service is updated on the client device, that newly updated instance may be the appropriate instance for the applications to use, e.g., because the service associated with the newly updated application may be the newest instance of the service. Thus, the update may trigger a determination of which instance of the push service to use (the determination taking into account some or all applications or just some or all updated applications), for example, by performing the example determination method of FIG. 2. All or some of the applications using the instance of the service may submit their own request for access to the service when an application is updated, or alternatively the update of an application may be considered a request from all or some of the applications using the service for access to the service. In particular embodiments, a request may be made when the update applies at least in part to the instance of the service included in the application being updated, e.g. when the instance of the service is updated.

At step 220, one of the applications that includes an instance of the service requested in step 210 is selected. In particular embodiments, the desired instance of the service (e.g., the application that contains that desired instance of the service) is selected by submitting a request to a selection service, which may be software included in the requesting application or may be software independent of the requesting application (e.g., in an independent application). The selection service may determine the application to use to access the service (e.g. the application containing the desired instance of the service) and return an identification of that application. In particular embodiments, the selection service may itself be a service that is selected for an application, for example by using the example method 200 to determine which instance of a selection service to use to a select a service for an application. In particular embodiments, a digital signature or other data identifying an application associated with an instance of a service may be checked, e.g. to ensure that the application is a known or trusted application.

In particular embodiments, the application to use to access the service may be determined according to one or more predetermined criteria. For example, the criteria may include a protocol version of the instance of the service. In particular embodiments, the protocol version may indicate that the instance of the service corresponds to a particular version of the service, such as the version of software on a server or other external computing device that provides the service. For example, for a push service, the protocol version may correspond to a version of the software on a server for providing the push service, to a version of the protocol used to communicate information between the server and the client device, or both. A higher protocol version may indicate that the instance of the push service on the client device is compatible with the software that provides the push service (including the communication protocol used to access the push service) on the server, or that the instance is capable of providing enhanced functionality (such as, for example, security features) corresponding to the version of the software or communication protocol.

In particular embodiments, criteria for determining an instance of a service to use may include an attribute or aspect of an application that includes the instance of the service. For example, some applications may be more desirable to use to access a service than others. For example, an application that have higher permissions to access data, hardware, or software functionality (such as access to sensor output) may be selected over applications that have fewer permissions to access such data, hardware, or software. In particular embodiments, applications that are pre-installed on a client computing device may have higher permissions than applications that a user installs. In particular embodiments, applications may have higher permissions based on user settings or preferences. In particular embodiments, an attribute may include the type of application. For example, a messaging application's instance of a service may be more desirable to use when the desired service relates to messaging. In particular embodiments, an attribute may include the developer or publisher of an application. For example, an application that desires access to a service may prefer to use instances of the service that are part of an application that is designed, made, or distributed by the same developer or publisher that designed, made, or distributed the requesting application. This disclosure contemplates any suitable attribute to use to select an instance of a service. In particular embodiments, the attributes used may be changed or varied, for example by a user of the device or by an update to the software determining the instance of the service to use.

In particular embodiments, criteria for determining an instance of a service to use may include information identifying the version of the application used to access the service. In particular embodiments, the version may be the version of the instance of the service. The version of the application or service may correspond to software updates for the application or the service. Thus, the most recently updated application, and, in particular embodiments, the most recently updated instance of the service, may be selected over applications or instance of the service that have not been updated to the latest version of the application or service.

In particular embodiments, the criteria used to determine an instance of a service may be ranked or weighted. For example, the criteria could include: 1) a protocol version of the instance of the service; 2) an attribute or aspect of the applications that include the instance of the service; and 3) information identifying the version of the application used to access the service. The criteria corresponding to 1) may take precedence over the criteria corresponding to 2), which may take precedence over the criteria corresponding to 3). In other words, an instance of the service that has a higher protocol version may always be selected over an instance of a service that is associated with an application having a more desirable attribute. In particular embodiments, the criteria may be weighted, such that an application with a very desirable attribute may be selected even when it has a lower protocol version. This disclosure contemplates any suitable method for ranking or weighting any suitable criteria.

At step 230, access to the service (e.g. the instance of the service selected in step 220) is provided to the requesting application. In particular embodiments, when an application is already accessing the service through an instance of the service and a determination is made about which instance is the appropriate one (for example, when an instance of the service is updated on the client device), step 230 may include determining that the instance the application is already using is the appropriate instance. In particular embodiments, step 230 may include determining whether the application including the instance to be used is running at least in the background of the client device. If the application is not running at least in the background of the client device, then step 230 may include loading the application into the background of the client device such that the requesting application can access the desired instance of the service. In particular embodiments, loading the application may involve loading only the portion of the application necessary to implement the desired service. In other words, other executable portions of the application that are not necessary to use the desired service may not be loaded into the background of the client device. In particular embodiments, step 230 may include closing an instance of the service, or the application including the instance of a service, that an application was using to access a service but that is no longer the desired instance to use.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for determining which of two or more instances of a service an application should use including the particular steps of the method of FIG. 2, this disclosure contemplates any suitable method for determining which of two or more instances of a service an application should use including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

As described more fully herein, an example service may be a selection service to determine which instance of a service one or more applications should use. The selection service may part of the applications that desire access to a service, or may be independent software. The selection service may perform all or some of the steps for determining which of two or more instances of a service an application should use, for example by implementing some or all of the steps of method 200. When multiple instances of a selection service exist, the appropriate instance of a selection service to use may be determined. For example, any of the criteria discussed in connection with step 220 of method 200 may be used to determine which instance of a selection service to use to select an instance of another service. The selection service may then determine which instance of the other service to use, for example by executing the steps of method 200.

Figure 3:
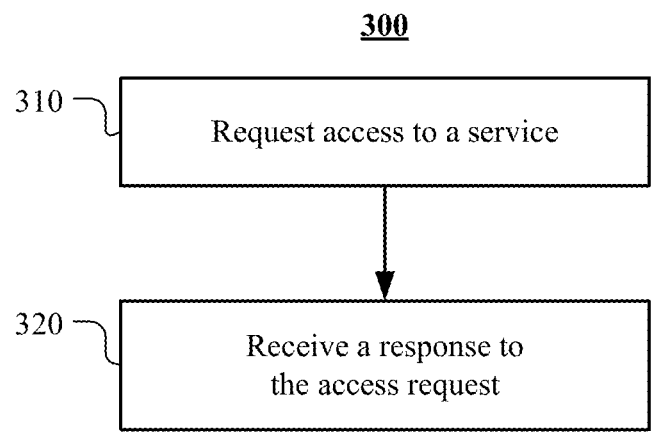
FIG. 3 illustrates an example method for determining which of two or more instances of a service an application should use.

FIG. 3 illustrates an example method 300 for determining which of two or more instances of a service an application should use. Method 300 is described from the viewpoint of a client application requesting a service.

Method 300 may begin at step 310, where a client application requests access to a service. In particular embodiments, a request for access may occur when the client application is installed. In particular embodiments, a request for access may occur when any client application hosting an instance of the requested service is installed. In particular embodiments, a request for access may occur when the client application is updated. In particular embodiments, a request for access may occur when any client application hosting an instance of the requested service is updated. In particular embodiments, a request may occur at periodic intervals, or on demand (e.g., initiated by a user, by the client application, by another application, or any suitable combination thereof). In particular embodiments, the client application's request may be made to a selection service. In particular embodiments, a selection service may submit requests on behalf of a client application, e.g., when the selection service determines that an installation or update of the client application has occurred.

At step 320, the client may receive a response to the request. In particular embodiments, the response may include an identification of one or more instances of a service that can satisfy the client's request to access the service. In particular embodiments, the request may be for all instances that can provide the service or for only some instances that can provide the service, and the corresponding response may identify all instances or some instances, as appropriate. As an example, Application A may request access to a service and receive a response that identifies Application A, Application C, Application D, and Application F as applications that all contain (or are associated with) instances of the requested service. In particular embodiments, the identified instances may be ranked or scored, as described more fully above, prior to receipt by the requesting client application. In particular embodiments, the client application may rank or score the instances, e.g. at least in part by using a selection service associated with that client application. In particular embodiments, receiving a response may include receiving only an identification of a selected instance of the requested service that the client application should use, e.g., the instance with the highest score as selected by a selection service. As described more fully herein, the selection service may be part of the client application, part of another client application, or its own dedicated application.

In particular embodiments, after a client application has identified the selected instance of a service to use to access a service, the client application may notify the instance, the application associated with the instance, the selection service, a proxy for the instance or application associated with the instance, or any suitable combination thereof, that the client application will use the selected instance to access the service. In particular embodiments, the client application may communicate directly with the instance of the service. In particular embodiments, the client application may use an intermediary, such as a stand-alone selection service, to communicate with the instance of the service.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for determining which of two or more instances of a service an application should use including the particular steps of the method of FIG. 3, this disclosure contemplates any suitable method for determining which of two or more instances of a service an application should use including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
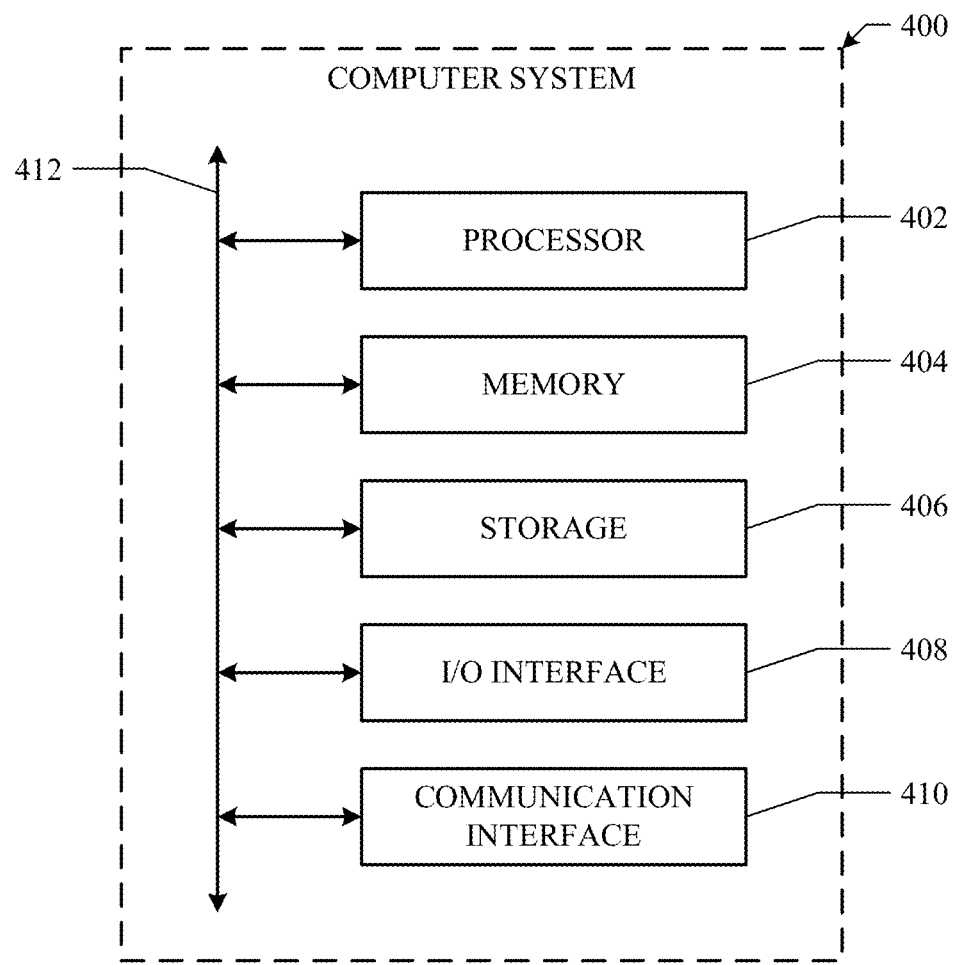
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. One or more computer-readable non-transitory storage media embodying software that is operable when executed to:

receive, from one of a plurality of applications of a client device, a request for access to a service, each of the plurality of applications comprising software for accessing the service;
determine, based on one or more criteria, one of the plurality of applications to use to access the service, wherein the criteria comprise:
first criterion comprising information identifying a protocol version of the software for accessing the service;
second criterion comprising an attribute of the one of the plurality of applications; and
third criterion comprising information identifying a version of the software for accessing the service; and
the first criterion tales precedence over the second criterion, and the second criterion takes precedence over the third criterion;
select the determined application; and
provide the requesting application access to the service through the selected application's software for accessing the service.

2. The media of claim 1, wherein the service comprises a push service.

3. The media of claim 1, wherein one or more of the plurality of applications further comprise the software that is operable when executed to:
receive a request from an application for access to a service, the application comprising one of a plurality of applications that each comprises software for accessing the service;
select one of the plurality of applications to use to access the service; and
provide the requesting application access to the service through the application determined to be used access the service.

4. The media of claim 1, wherein the attribute comprises one or more permissions to access data on a client device on which the one of the plurality of applications resides.

5. The media of claim 1, wherein the software that is operable when executed to provide the requesting application access to the service comprises software that is further operable when executed to:
determine whether the application to be used to access the service is running at least in the background on a client device; and
when the application is not running at least in the background on the client device, cause at least the portion of the application comprising the software for accessing the service to be executed by the client device.

6. The media of claim 5, wherein the software that is operable when executed to cause at least the portion of the application comprising the software for accessing the service to be executed by the client device comprises software that is further operable when executed to cause only the portion of the application comprising the software for accessing the service to be executed by the client device.

7. The media of claim 1, wherein the software that is operable when executed to select one of the plurality of applications to use to access the service comprises software that is further operable when executed to:
submit a request to access the service to a selection service for selecting one of the plurality of applications to use to access the service; and
receive from the selection service an identification of the selected application.

8. The method of claim 7, wherein each application further comprises an instance of the selection service; and the software that is operable when executed to submit a request to access the service to a selection service comprises software that is further operable when executed to:
    select one of the instances of the selection service; and
    submit the request to the selected instance of the selection service.

9. The method of claim 8, wherein the software that is operable when executed to select one of the instances of the selection service comprises software that is further operable when executed to select, based on one or more criteria, the instance of the selection service, the criteria comprising one or more of:
    first criterion comprising information identifying a protocol version of the instance of the selection service;
    second criterion comprising an attribute of the application comprising the instance of the selection service; and
    third criterion comprising information identifying a version of the instance of the selection service.

10. The media of claim 1, wherein the software that is operable when executed to receive a request from an application for access to a service comprises software that is further operable when executed to receive a notification that the application is running on a client device.

11. The media of claim 1, wherein the software that is operable when executed to receive a request from an application for access to a service comprises software that is further operable when executed to receive a notification that one of the plurality of applications was installed on a client device.

12. The media of claim 1, wherein the software that is operable when executed to receive a request from an application for access to a service comprises software that is further operable when executed to receive a notification that an update for one of the plurality of applications was installed on a client device.

13. A method comprising:
    by a computing device, receiving, from one of a plurality of applications of a client device, a request for access to a service, each of the plurality of applications comprising software for accessing the service;
    by a computing, device, determining, based on one or more criteria, one of the plurality of applications to use to access the service, wherein the criteria comprise:
    first criterion comprising information identifying a protocol version of the software for accessing the service;
    second criterion comprising an attribute of the one of the plurality of applications; and
    third criterion comprising information identifying a version of the software for accessing the service; and
    the first criterion takes precedence over the second criterion, and the second criterion takes precedence over the third criterion;
    by a computing device, selecting the determined application; and
    by a computing device, providing the requesting application access to the service through the selected application's software for accessing the service.

14. The method of claim 13, further comprising:
    determining, by a computing device, whether the application to be used to access the service is running at least in the background on a client device; and
    when the application is not running at least in the background on the client device, causing, by a computing device, at least the portion of the application comprising the software for accessing the service to be executed by the client device.

15. The method of claim 13, further comprising:
    submitting, by a computing device, a request to access the service to a selection service for selecting one of the plurality of applications to use to access the service; and
    receiving from the selection service an identification of the selected application.

16. The method of claim 13, wherein the service comprises a push service.

17. A system comprising:
    one or more processors; and a memory coupled to the processors comprising instructions executable by the processors, the processors being operable when executing the instructions to:
    receive, from one of a plurality of applications of a client device, a request for access to a service, each of the plurality of applications comprising software, for accessing the service;
    determine, based on one or more criteria, one of the plurality of applications to use to access the service, wherein the criteria comprise:
    first criterion comprising information identifying a protocol version of the software for accessing the service;
    second criterion comprising an attribute of the one of the plurality of applications; and
    third criterion comprising information identifying a version of the software for accessing the service; and
    the first criterion takes precedence over the second criterion, and the second criterion takes precedence over the third criterion;
    select the determined application; and
    provide the requesting application access to the service through the selected application's software for accessing the service.

18. The system of claim 17, wherein the processors are further operable when executing the instructions to:
    determine whether the application to be used to access the service is running at least in the background on a client device; and
    when the application is not running at least in the background on the client device, cause at least the portion of the application comprising the software for accessing the service to be executed by the client device.

19. The system of claim 17, wherein the processors are further operable when executing the instructions to:
    submit a request to access the service to a selection service for selecting one of the plurality of applications to use to access the service; and
    receive from the selection service an identification of the selected application.

20. The system of claim 17, wherein the service comprises a push service.

* * * * *